United States Patent Office 3,579,524
Patented May 18, 1971

3,579,524
2-AMINOALKYL DERIVATIVES OF PHTHALIMIDINES
John William Van Dyke, Jr., Elkhart, Ind., assignor to Miles Laboratories, Inc., Elkhart, Ind.
No Drawing. Filed June 5, 1968, Ser. No. 734,574
Int. Cl. C07d 29/30
U.S. Cl. 260—294                                 6 Claims

ABSTRACT OF THE DISCLOSURE 2-aminoalkyl derivatives of phthalimidine that are useful as antihypertensive agents. Prepared by reacting phthalic anhydride with a suitable amine and selectively reducing one of the oxo groups of the resulting phthalimide to form the desired compound.

This invention relates to a novel series of chemical compounds having beneficial properties and a process for the preparation thereof. More particularly, this invention relates to 2-aminoalkyl derivatives of phthalimidine possessing advantageous pharmacological properties.

New compounds of this invention may be represented by the structural formula:

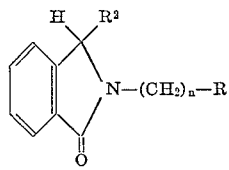

in which $R^1$ is a heterocyclic moiety including at least one nitrogen atom and is joined to the alkylene group by a nitrogen atom, $R^2$ is a member selected from the group consisting of H and OH, and $n$ is an integer between about 2 and 5. Preferably, $R^1$ is

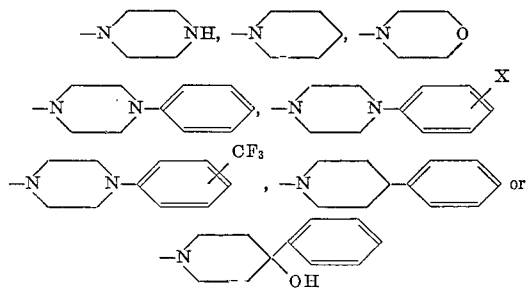

in which $x$ is a halogen.

The compounds of this invention are readily prepared by reacting phthalic anhydride with a suitable aminoalkyl amine and then reducing the resulting phthalimide with controlled reduction conditions selected according to the final compound desired.

A phthalimidine that is unsubstituted at the 3-position is formed by reducing the phthalimide with a strong reducing agent. Such strong reducing agent is advantageously a metal-acid combination and is preferably a zinc-acetic acid combination. These reactants are beneficially heated to reflux with stirring for a period of hours, such as about 4 hours or more.

A 3-hydroxy substituted compound is formed by using milder reducing conditions. Preferably, a reducing agent comprising magnesium and ammonium chloride is used although other mild reducing agents, such as sodium borohydride and alcohol between about 25 and 30° C. and lithium aluminum hydride and THF below 25° C. are satisfactory.

In this reaction, the phthalic anhydride and amine are beneficially heated to a temperature substantially above the melting point of phthalic anhydride, for instance, between about 180 and 240° C. The reactants are maintained at this elevated temperature for a convenient period of time to permit completion of the reaction. Such reaction time is preferably a matter of hours, such as about four hours or more. Conditions of this reaction are not considered critical and may be varied somewhat within the stated guide lines.

To form the proper compound, conditions for the reduction of the phthalimide should be carefully selected. When only partial reduction is preferred, a milder reducing agent is selected and the conditions of the reaction adjusted accordingly. With a magnesium-ammonium chloride combination, the reactants, after an initial reaction period, are heated to reflux with stirring. With other mild reducing agents the conditions of the reaction are adjusted as set forth previously.

Preparation of the novel compounds of this invention is illustrated in the following chemical equation

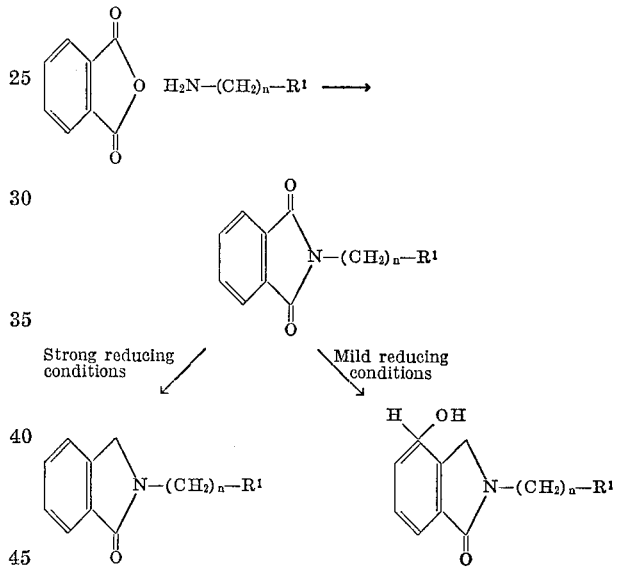

These compounds may be prepared as the free bases illustrated in the chemical equation or they may be further reacted to form an acceptable acid addition salt. Preferably, nontoxic pharmacologically acceptable acid addition salts are formed. These acid addition salts may be prepared from mineral acids such as halogen acids or sulfuric acid, or organic acids such as citric acid, maleic acid, oxalic acid and other similar acids. Preparation of these acid addition salts will be described in subsequent detailed examples and will not, theerfore, be set forth at this point.

The compounds of this invention have beneficial pharmacological properties. More particularly, these compounds, in therapeutic does have utility as antihypertensive agents.

Medications may be prepared including at least one of the novel compounds of this invention as an active ingredient in the form of the free base or pharmacologically acceptable acid addition salt thereof. These medications may be conveniently prepared by combining the active ingredient with a pharmaceutical vehicle including components selected from the fillers, carriers, extenders, excipients, and the like generally used in pharmaceutical formulations. Medications may be prepared in the solid state as tablets or capsules or in the liquid state as suspensions. Similar dosage forms suitable for oral, subcutaneous, intraperitoneal, or other convenient means of administration can also be provided. The pharmaceutical vehicle may also include common diluents or tableting adjuncts such as cellulose powder, cornstarch, lactose, talc and such, used according to accepted pharmaceutical manufacturing practices. Unit dosages (a specific weight, such as mg. or g.) of active ingredient in a medication may be varied so that an adequate amount is present to provide a desired therapeutic dose without untoward side effects. A therapeutic dose is considered as the ratio of the weight of active ingredient administered to a patient's body weight, usually expressed as mg./kg., that elicits a desired therapeutic result.

This invention will be further understood by reference to the following examples which are provided as illustrations and are not intended to be construed as limitations upon the invention which is properly set forth in claims appended hereto.

EXAMPLE 1

N-3-(4-phenyl-1-piperazyl)propylphthalimidine maleate

A mixture of 20 g. of 4-phenyl-1-(3-aminopropyl(piperazine and 13.5 g. of phthalic anhydride was maintained at 180–240° C. for 4 hours. The mixture was allowed to cool to room temperature and a solid formed which was then dissolved in 2-propanol, treated with charcoal and filtered. The solution was cooled to room temperature (about 23° C.) and 26 g. of yellow needles were obtained (M.P. 133–134° C.). The solid was dissolved in 250 ml. of glacial acetic acid, heated to 60° C. and 24.4 g. of zinc dust added all at once with mechanical stirring. The reaction mixture was heated at reflux with stirring for 4 hours and filtered hot with suction. The filter cake was washed with three 50 ml. portions of glacial acetic acid. The combined filtrate was evaporated to a small volume under vacuum and excess sodium bicarbonate solution added. The mixture was extracted with four 150 ml. portions of $CHCl_3$. The combined extracts were washed once with saturated $NaHCO_3$ solution and twice with water. The $CHCL_3$ solution was dried and concentrated. Ether was added to the solid and a white solid precipitated (18.5 g.). The solid was recrystallized twice from $CHCl_3$-ether-n-pentane (M.P. 87–88° C.). The free base was dissolved in $CHCl_3$ and 6 g. of maleic acid in 2-propanol added. Ether was added to the cloud point and the solution allowed to stand overnight. White crystals precipitated and were filtered and dried. Yield, 16.5 g. (M.P. 173–174° C.).

*Analysis.*—Calcd. for $C_{25}H_{29}N_3O_5$ (percent): N(basic), 3.10; N(total), 9.31. Found (percent): N(basic), 3.09; N(total), 9.50.

EXAMPLE 2

N-3-(4-phenyl-1-piperidyl)propylphthalimidine hydrochloride

A mixture of phthalic anhydride (14.8 g. 0.1 mole) and 4-phenyl-1-(3-aminopropyl)piperidine (21.8 g., 0.1 mole) was maintained at between 190 and 210° C. for 4 hours. The mixture was cooled to room temperature and a solid formed which was recrystallized from 2-propanol to give 26.5 g. of a solid (M.P. 107–108° C.). This solid was placed in 250 ml. glacial acetic acid and heated to 60° C. Zinc dust (24.9) was added all at once with stirring to the mixture and the mixture heated to reflux for 4 hours. The reaction mixture was filtered and the filter cake washed with several portions of acetic acid. The filtrate was concentrated in vacuo and the residue treated with $NaHCO_3$ solution. The mixture was extracted with $CHCl_3$, and the extract dried and concentrated. The resulting solid was treated with HCl and 2-propanol. The salt that formed was filtered, washed with ether and dried. Yield, 10 g. (M.P. 244–246° C.).

*Analysis.*—Calcd. for $C_{22}H_{27}ClN_2O$ (percent): N, 7.57; Cl, 9.58. Found (percent) N, 7.65; Cl, 9.46.

EXAMPLE 3

N-3(-4-phenyl-4-hydroxy-1-piperidyl)propylphthalimidine hydrochloride

A mixture of phthalic anhydride (14.8 g., 0.1 mole) and 4-phenyl - 4 - hydroxy-1-(3-aminopropyl)piperidine (23.4 g., 0.1 mole) was maintained at 190–200° C. for 4 hours. The reaction mixture was allowed to cool to room temperature and a solid formed. The solid was dissolved in 215 ml. of glacial acetic acid and 40 g. of zinc dust added with stirring. This reaction mixture was heated to reflux with stirring for 4 hours. The hot mixture was filtered and the filter cake washed with several portions of acetic acid. The filtrate was concentrated and the resulting residue made alkaline with dilute NaOH. The residue and sodium hydroxide mixture was extracted with $CHCl_3$ and the $CHCl_3$ solution concentrated. The solid which formed was recrystallized from ethyl acetate, yield, 17 g. (M.P. 115–116° C.). The solid was dissolved in 2-propanol and HCl in 2-propanol added. A salt formed which was washed with ether and dried. Yield 17 g. (M.P. 232–233° C.).

*Analysis.*—Calcd. for $C_{22}H_{21}ClN_2O_2$ (percent): N, 7.24; Cl, 9.16. Found (percent): N, 7.28; Cl, 9.22.

EXAMPLE 4

N-3-(4-m-chlorophenyl-1-piperazyl)propylphthalimidine maleate

A mixture of phthalic anhydride (14.8 g., 0.1 mole) and 4 - m - chlorophenyl-1-(3-aminopropyl)piperazine (25.4 g., 0.1 mole) was maintained at 190–210° C. for 4 hours. The mixture was allowed to cool to room temperature and a solid formed which was recrystallized from ethyl acetate to give a solid (27.5 g., M.P. 48–49° C.). A solution of this solid in 250 ml. of glacial acetic acid was heated to 60° C. and 25 g. of zinc dust added with stirring. The reaction mixture of the solid, glacial acetic acid and zinc was heated to reflux with stirring for 4 hours. The hot reaction mixture was filtered and the filter cake washed with acetic acid. The filtrate was treated with $NaHCO_3$ solution and extracted wiht $CHCl_3$. The extract was dried and concentrated. The concentrate was stirred with petroleum ether and gave a crude solid. This solid was recrystallized from ethyl acetate and formed a solid (13.7 g., M.P. 86–87° C.). An equivalent amount of maleic acid in 2-propanol was added to this solid. A salt formed that was washed with 2-propanol and dried. Yield, 17 g. (M.P. 170–171° C.).

*Analysis.*—Calcd. for $C_{25}H_{28}ClN_3O_5$ (percent): N(basic), 2.88; N(total), 8.65. Found (percent): N(basic), 2.83; N(total), 8.64.

EXAMPLE 5

N-3-(4-m-trifluoromethylphenyl-1-piperazyl)propyl-phthalimidine maleate

A mixture of phthalic anhydride (14.8 g., 0.1 mole) and 4 - (m - trifluoromethylphenyl)-1-(3-aminopropyl) piperazine (32.1 g., 0.1 mole) was heated and maintained at 190–200° C. for 4 hours. The mixture was allowed to cool to room temperature and a solid formed. The solid was dissolved in 250 ml. of glacial acetic acid and 40 g. of zinc dust added with stirring. This mixture was heated to reflux for 4 hours. The hot mixture was filtered and the filter cake washed with acetic acid. The filtrate was concentrated and made basic with NaOH. This basic solution was extracted with $CHCl_3$, the extract dried and concentrated. The solid that formed was recrystallized from petroleum ether and ethyl acetate, yield 21.7 g. (M.P. 93–94° C.). To this solid (free base) in 2-propanol, 6.23 g. of maleic acid in 2-propanol was added. A salt formed as a solid and was filtered and dried. Yield, 26 g. (M.P. 153–154° C.).

*Analysis.*—Calcd. for $C_{26}H_{28}F_3N_3O_4$ (percent): N(basic), 2.70; N(total), 8.10. Found (percent): N(basic), 2.72; N(total), 8.04.

EXAMPLE 6

N-4-(4-phenyl-1-piperazyl)butylphthalimidine maleate

A mixture of phthalic anhydride (14.8 g., 0.1 mole) and 4-phenyl-1-(4-aminobutyl)piperazine (23.2 g., 0.1 mole) was maintained at 190–200° C. for 4 hours. The reaction mixture was allowed to cool to room temperature and a solid formed which was dissolved in 250 ml. of glacial acetic acid. Zinc dust (40 g.) was added to the glacial acetic mixture and the mixture heated to reflux with stirring for 4 hours. The hot mixture was filtered and the residue washed with several portions of acetic acid. The filtrate was concentrated and made alkaline with dilute NaOH. The alkaline filtrate was extracted with $CHCl_3$. The extract was dried and concentrated to dryness. The solid was recrystallized from aqueous 2-propanol, yield, 21 g. (M.P. 90–91° C.). To the solid (free base) an equivalent of maleic acid in 2-propanol was added. The salt was collected, washed with ether and dried. Yield, 25 g. (M.P. 159–160° C.).

*Analysis.*—Calcd. for $C_{26}H_{31}N_3O_5$ (percent) N(total), 9.03; N(basic), 3.01. Found (percent): N(total), 9.13; N(basic), 2.98.

EXAMPLE 7

N-2-(4-phenyl-4-hydroxy-1-piperidyl)ethylphthalimidine hydrochloride

A mixture of phthalic anhydride (11.5 g.) and 4-phenyl-4-hydroxy-1-(2-aminoethyl)piperidine (17 g.) was maintained at 180–190° C. for 4 hours. The mixture was allowed to cool to room temperature and a solid formed which was dissolved in methanol-2-propanol, treated with charcoal, filtered and the solvents removed. The solid residue that formed was stirred with ether and filtered. Yield, 15.5 g. (M.P. 134–135° C.). The solid was dissolved in 150 ml. of glacial acetic acid and 15 g. of zinc dust added. This reaction mixture was heated to reflux with stirring for 4 hours. The hot mixture was filtered and the filter cake washed with glacial acetic acid. The filtrate was concentrated and made basic with $NaHCO_3$ solution. This basic solution was extracted with $CHCl_3$, and the extract dried and concentrated. The solid formed was triturated with ether and a white solid (9 g., M.P. 196–198° C.) obtained. The white solid was dissolved in methanol and excess HCl in 2-propanol added. The methanol was evaporated and the 2-propanol solution allowed to cool slowly. White plates formed that were filtered and dried. Yield, 7.0 g. [M.P. 251–252° C. (fast heating); M.P. 236–239° C. (slow heating)].

*Analysis.*—Calcd. for $C_{21}H_{25}ClN_2O_2$ (percent): N, 7.51; Cl, 9.51. Found (percent): N, 7.46; Cl, 9.56.

EXAMPLE 8

2-[3-(4-phenyl-1-piperazyl)propyl]-3-hydroxyphthalimidine oxalate

To a solution of 750 ml. of methyl alcohol and 160 ml. of saturated aqueous ammonium chloride was added 8.0 g. of magnesium and 20 g. of N-3-(4-phenyl-1-piperazyl) propylphthalimide (cf. Example 1). The mixture was allowed to stand 36 hours and then heated to reflux until all the magnesium reacted. The solution was filtered and the methyl alcohol removed under reduced pressure. The organic material in the filtrate was extracted with $CHCl_3$ and the extract dried. The $CHCl_3$ was removed, the residue dissolved in a mixture of benzene-$CHCl_3$ and chromatographed on a column containing alumina. One gram of starting material was obtained by eluting with benzene. The desired free base (11.5 g., M.P. 113–114° C.) was obtained by eluting the column with $CHCl_3$. The $CHCl_3$ solution was dried and concentrated to solid free base. The free base was dissolved in 2-propanol and oxalic acid in 2-propanol added. A white oxalate precipitated and was filtered. The white oxalate was heated with methanol and cooled. The resulting solid wah filtered and dried. Yield, 7.5 g. (M.P. 214–215° C.).

*Analysis.*—Calcd. for $C_{22}H_{26}N_3O_4$ (percent): N(total), 10.60; N(basic), 3.54. Found (percent): N(total), 10.68; N(basic), 3.52.

EXAMPLE 9

2-[3-(4-phenyl-1-piperidyl)propyl] - 3 - hydroxyphthalimidine hydrochloride

To a solution of 1 liter of methyl alcohol and 180 ml. of saturated aqueous ammonium chloride was added 9.0 g. of magnesium and 23.6 g. of N-3-(4-phenyl-1-piperidyl) propylphthalimide (cf. Example 2). The mixture was heated slightly to get the reaction started and then allowed to stand overnight. The mixture was then heated unil all the magnesium reacted. The mixture was filtered hot and the methanol removed under reduced pressure. A yellow oil was extracted with $CHCl_3$ and dried. The $CHCl_3$ was removed and an oil obtained. Ether was added to the oil and a solid hydrochloride (19 g.) was obtained. The solid was recrystallized twice, once from 2-propanol-ether and once from $CHCl_3$-ethyl acetate. The hydrochloride was filtered and dried. Yield, 15 g. (M.P. 182–183° C.).

*Analysis.*—Calcd. for $C_{22}H_{27}ClN_2O_2$ (percent): C, 68.29; H, 7.03; N, 7.24; Cl, 9.17. Found (percent): C, 67.98; H, 7.00; N, 7.37; Cl, 9.33.

EXAMPLE 10

2-[5-(4-phenyl-1-piperazyl)pentyl] - 3 - hydroxyphthalimidine hydrochloride

A mixture of phthalic anhydride (14.8 g., 0.1 mole) and 4-phenyl-1-(5-aminopentyl)piperazine (24.7 g., 0.1 mole) was maintained at 190–210° C. for 4 hours. A solid formed that was recrystallized from 2-propanol to yield 34 g. of product (M.P. 104–105° C.). To a solution of the solid in 1 liter of methanol was added 180 ml. of saturated $NH_4Cl$ (1 mole) and 9 g. (0.37 mole) of magnesium. A reaction soon started at room temperature and the mixture was allowed to stand overnight. The mixture was heated to reflux for 4 hours and filtered. The solvent was concentrated and the residue extracted with $CHCl_3$. The $CHCl_3$ extract was dried and evaporated 23 g.). The material was dissolved in benzene and chromatographed on a column containing alumina. The column was eluted with benzene and starting material (2 g.) was obtained. The column was eluted with $CHCl_3$ and the free base as an oil (14 g.) was obtained. To the free base (13.4 g.) was added HCl in 2-propanol. The resulting salt was recrystallized from aqueous 2-propanol to give 13 g. of solid (M.P. 159–160° C.).

*Analysis.*—Calcd. for $C_{23}H_{30}ClN_3O_2$ (percent): N (total), 10.11; Cl, 8.53. Found (percent): N(total), 10.30; Cl, 8.49.

EXAMPLE 11

2-[3-(4-hydroxy-4-phenyl-1-piperidyl)propyl]-3-hydroxyphthalimidine hydrochloride To a solution of 1 liter of methyl alcohol and 240 ml. of saturated aqueous ammonium chloride was added 12 g. of magnesium and 28.5 g. of N-3-(4-phenyl-4-hydroxy-1-piperidyl)propylphthalimide (cf. Example 3). The mixture was allowed to stand at room temperature for 18 hours. The mixture was heated at reflux for 2 hours and the solvent removed under reduced pressure. The residue was extracted with hot $CHCl_3$. The $CHCl_3$ was dried and removed under reduced pressure. The resulting solid was dissolved in 2-propanol and ethyl acetate-ether was added. On cooling a white hydrochloride was obtained. Yield, 5.5 g. (M.P. 185–186° C.). An additional 8.5 g. of product was obtained by further $CHCl_3$ extraction of the original residue.

*Analysis.*—Calcd. for $C_{22}H_{27}ClN_2O_3$ (percent): N (total), 6.95; N(basic), 3.48. Found (percent): N(total), 6.98; N(basic), 3.52.

EXAMPLE 12

Determination of antihypertensive activity was made substantially according to the procedure outlined by Pardo, E. G. and Vidrio, H.: J. Pharmacol, and Exper Therap 144:124 (1964). Briefly, in this procedure, dogs were made hypertensive by repeated daily administration per os of 10 mg./kg. of mecamylamine during a control period. During this period of time the systolic and diastolic arterial pressure was indirectly measured daily immediately prior to administration of the drug to a fasting animal. After the control period, a medication including as an active ingredient at least one of the compounds of this invention was administered with the mecamylamine. A dose of 10 mg./kg. of active ingredient was utilized daily. This medication was continued for 28 days during which time the same blood pressure measurements were made. A gradual decrease in blood pressure levels was observed. A maximum of about 30 mm. Hg in both systolic and diastolic pressures were noted.

EXAMPLE 13

Toxicity of the compounds of this invention was determined by administering each in graduated doses to separate groups of rats and observing the animals' reactions. $LD_{50}$'s (doses at which there was 50% mortality) between 100 and 1470 mg./kg. were observed when the active ingredients were administered per os.

What is claimed is:

1. A compound selected from the group consisting of compounds of the formula:

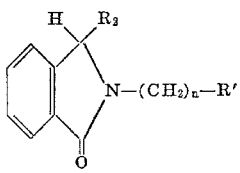

in which R' is a member selected from the group consisting of

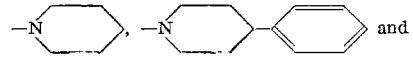 and

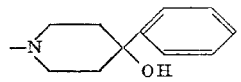

$R_2$ is a member selected from the group consisting of H and OH, and $n$ is an integer between 2 and 5, and pharmacologically acceptable salts thereof.

2. A compound according to claim 1 which is N-3-(4-phenyl-1-piperidyl)propylphthalimide.

3. A compound according to claim 1 which is N-3-(4-phenyl-4-hydroxy-1-piperidyl)propylphthalimide.

4. A compound according to claim 1 which is N-2-(4-phenyl-4-hydroxy-1-piperidyl)ethylphthalimidine.

5. A compound according to claim 1 which is 2-[3-(4-phenyl-1-piperidyl)propyl]-3-hydroxyphthalimidine.

6. A compound according to claim 1 which is 2-[3-(4-hydroxy - 4 - phenyl - 1 - piperidyl)propyl]-3-hydroxyphthalimidine.

References Cited

UNITED STATES PATENTS 2,957,872  10/1960  Huebner _____ 260—247.2

OTHER REFERENCES

Horii et al.: J. Org. Chem. 26, 2273–6 (1961).

Ohki: J. Pharm. Soc. Japan 70, 92–101 (1950), [original unavailable, CA. 44; 5867h supplied].

Sakurai: Shinshu Daigaku Bunriga Kubu Kiyo No. 5 pt. II, 11–16 (1955), [original unavailable, C.A. 54:22096i supplied].

HENRY R. JILES, Primary Examiner

G. T. TODD, Assistant Examiner

U.S. Cl. X.R.

260—247.2, 268; 424—267

PO-1050
(5/69)

UNITED STATES PATENT OFFICE
CERTIFICATE OF CORRECTION

Patent No. 3,579,524                     Dated  May 18, 1971

Inventor(s)  John William Van Dyke, Jr.

It is certified that error appears in the above-identified patent and that said Letters Patent are hereby corrected as shown below:

| | |
|---|---|
| Column 1, Lines 26-33, | Change formula to read, 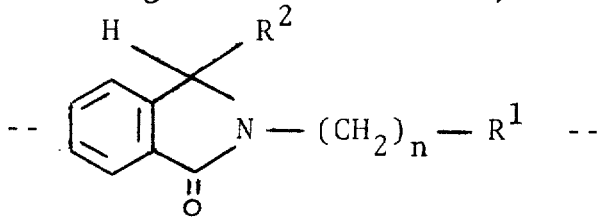 |
| Column 1, Lines 42-44 | In the structural formula, "X" should read --x--. |
| Column 2, Lines 39-45, | The product of "Mild reducing conditions" should read, 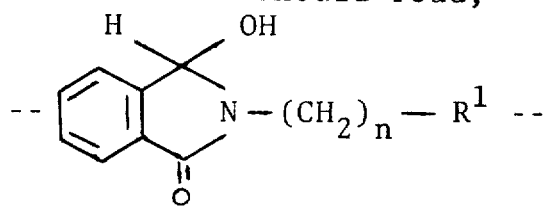 |
| Column 2, Line 59, | The word "does" should read --doses--. |
| Column 4, Line 40, | The word "wiht" should read --with--. |
| Column 6, Line 1, | The word "wah" should read --was--. |

PO-1050
(5/69)

UNITED STATES PATENT OFFICE
CERTIFICATE OF CORRECTION

Patent No. 3,579,524      Dated May 18, 1971

Inventor(s) John William Van Dyke, Jr.      PAGE - 2

It is certified that error appears in the above-identified patent and that said Letters Patent are hereby corrected as shown below:

| | |
|---|---|
| Column 6, Line 15, | The word "unil" should read --until--. |
| Column 7, Claim 1, | The structural formula should read 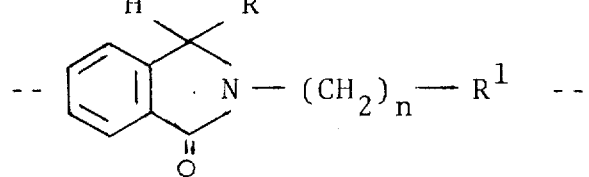 |
| Column 8, Line 1, | The expression "R'" should read -- $R^1$ -- |
| Column 8, Line 9, | The expression "$R_2$" should read -- $R^2$ -- |
| Column 8, Claim 2, | In the chemical name "phthalimide" should read --phthalimidine--. |
| Column 8, Claim 3, | In the chemical name "phthalimide" should read --phthalimidine--. |

Signed and sealed this 9th day of November 1971.

(SEAL)
Attest:

EDWARD M. FLETCHER, JR.        ROBERT GOTTSCHALK
Attesting Officer              Acting Commissioner of Patents